United States Patent
López Ruiz et al.

(10) Patent No.: US 11,730,309 B2
(45) Date of Patent: Aug. 22, 2023

(54) METHOD FOR BREWING COFFEE

(71) Applicant: Azkoyen, S.A., Navarra (ES)

(72) Inventors: José María López Ruiz, Navarra (ES); Luis María Lumbier Moleres, Navarra (ES); Pedro Javier Pascal Martínez, Navarra (ES); Emilio De Hita Hernández, Navarra (ES)

(73) Assignee: Azkoyen, S.A., Peralta (ES)

( * ) Notice: Subject to any disclaimer, the term of this patent is extended or adjusted under 35 U.S.C. 154(b) by 430 days.

(21) Appl. No.: 16/836,140

(22) Filed: Mar. 31, 2020

(65) Prior Publication Data
US 2020/0305633 A1 Oct. 1, 2020

(30) Foreign Application Priority Data
Apr. 1, 2019 (EP) .................................... 19382234

(51) Int. Cl.
*A47J 31/36* (2006.01)
*A47J 31/52* (2006.01)

(52) U.S. Cl.
CPC ......... *A47J 31/3671* (2013.01); *A47J 31/525* (2018.08)

(58) Field of Classification Search
CPC ............................. A47J 31/525; A47J 31/3671
See application file for complete search history.

(56) References Cited

U.S. PATENT DOCUMENTS

| | | | | |
|---|---|---|---|---|
| 10,130,207 B2 * | 11/2018 | Doglioni | ............. | A47J 31/3609 |
| 2005/0193891 A1 * | 9/2005 | Garson | ............... | A47J 31/3614 99/279 |
| 2009/0293733 A1 * | 12/2009 | Martin | .................... | A47J 31/60 99/280 |
| 2013/0295244 A1 * | 11/2013 | Reyhanloo | .......... | A47J 31/4496 99/283 |
| 2016/0157665 A1 * | 6/2016 | Doglioni Majer | .. | A47J 31/3676 426/433 |
| 2016/0366905 A1 * | 12/2016 | Diester | ............... | A47J 31/3671 |

FOREIGN PATENT DOCUMENTS

| | | |
|---|---|---|
| EP | 2832270 A1 | 2/2015 |
| WO | 2008/038201 A2 | 4/2008 |

OTHER PUBLICATIONS

European Search Repod for EP Application No. 19382234, entitled "Method and Machine for Brewing Coffee," dated Sep. 3, 2019.

* cited by examiner

*Primary Examiner* — Anthony J Weier
(74) *Attorney, Agent, or Firm* — Hamilton, Brook, Smith & Reynolds, P.C.

(57) ABSTRACT

The method includes the steps of loading ground coffee in a dispensing chamber; pressing said ground coffee present in the dispensing chamber by means of a piston (1) for the compaction thereof; dispensing the ground coffee; supplying the brewed coffee to a user; and determining if the position of the piston (1) varies depending on the amount of ground coffee that is loaded in said dispensing chamber.

8 Claims, 1 Drawing Sheet

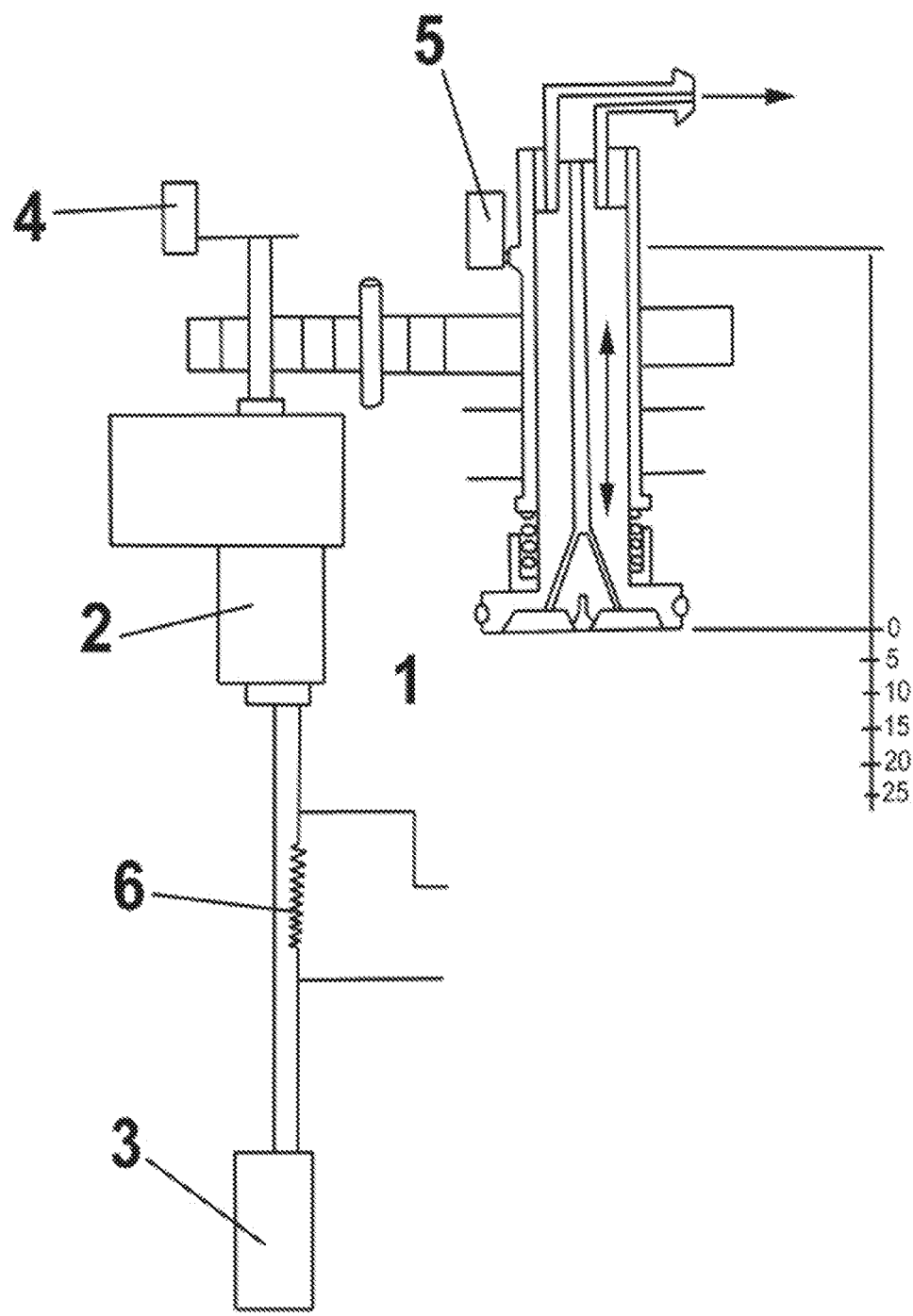

METHOD FOR BREWING COFFEE

RELATED APPLICATION(S)

This application claims priority under 35 U.S.C. § 119 or 365 to European Application No. 19382234.3, filed Apr. 1, 2019. The entire teachings of which are incorporated herein by reference.

DESCRIPTION

The present invention relates to a method and machine for brewing coffee, which enables the intensity of the coffee to be automatically adapted to the personal tastes of the consumer.

BACKGROUND OF THE INVENTION

Coffee machines, in particular, self-service coffee machines comprise a grinder in which the coffee is ground.

Once it is ground, the ground coffee is supplied to a dispensing chamber in which it is compacted by a piston and subsequently hot water is provided in order to perform the dispensing and thereby brew the coffee drink, which is supplied to the user.

The user can choose the type of coffee they wish to drink based on their tastes, and this implies, for example, that the volume of coffee inside the dispensing chamber can vary.

Due to the variation in the amount of coffee in the dispensing chamber, the pressure applied by the piston must be adjusted to said amount of coffee, since otherwise the quality of the coffee drink would not be adequate.

Conventionally, the pressure exerted by the piston on the ground coffee is elastically adapted by means of a spring, applying more or less pressure depending on the amount of ground coffee present inside the dispensing chamber.

However, in practice, it has been demonstrated that said pressure which is variable by means of elastic means is not optimal for all the possible volumes of coffee, thus not providing the best quality of the coffee brewed for said volumes.

Therefore, an objective of the present invention is to provide a method and a machine for brewing coffee which enables the intensity of the coffee to be adapted to the personal tastes of the consumer, providing coffee with an optimal flavour depending on the amount of ground coffee present inside the dispensing chamber.

DESCRIPTION OF THE INVENTION

The mentioned drawbacks are resolved with the method and machine of the invention, while presenting other advantages which will be described below.

According to a first aspect, the present invention relates to a method for brewing coffee, comprising the steps of:
 loading ground coffee in a dispensing chamber;
 pressing said ground coffee present in the dispensing chamber by means of a piston for the compaction thereof;
 dispensing the ground coffee;
 supplying the brewed coffee to a user;
 and also comprises the step of determining if the position of the piston varies depending on the amount of ground coffee that is loaded in said dispensing chamber.

Advantageously, said step for determining the variation in the position of the piston is performed before the step for dispensing and after the step for pressing the ground coffee.

Said variation in the position of the piston is a movement of the piston with respect to the compacted ground coffee present inside the dispensing chamber.

Preferably, said variation in the position of the piston is proportional to the amount of ground coffee present in the dispensing chamber. Meaning, said variation in the position is larger when more ground coffee is present inside the dispensing chamber.

The method according to the present invention also preferably comprises a step for determining a reference position of said piston.

Furthermore, the variation in the position of the piston is performed if the amount of ground coffee present in the dispensing chamber is greater than a predetermined minimum value, meaning, if the amount of ground coffee coincides with said predetermined minimum value, no variation in the position is produced.

The method according to the present invention also preferably comprises the step for pressing the ground coffee after the dispensing in order to expel the excess water and a step for releasing the internal pressure in the dispensing chamber after the dispensing and before the step for moving the piston.

Advantageously, the method according to the present invention also comprises a step for prior infusion before the step for dispensing.

According to a second aspect, the present invention relates to a machine for brewing coffee according to the previously described method, comprising:
 a dispensing chamber in which the ground coffee is loaded and in which said ground coffee is distributed;
 a piston which presses the ground coffee in said dispensing chamber for the compaction thereof; and
 a motor which actuates the movement of said piston;
 wherein said motor actuates the movement of said piston a predetermined distance after the dispensing if it is determined that the amount of ground coffee present in the dispensing chamber is greater than a predetermined minimum amount.

Preferably, said motor is a DC motor comprising a voltage regulator, and the machine also comprises a pulse counter which counts the rotation pulses of the output shaft of the motor.

Furthermore, the machine for brewing coffee according to the present invention also advantageously comprises a position detector for said piston and a resistance which measures the compaction force applied by the piston on the ground coffee present in the dispensing chamber.

The method and the machine according to the present invention is able to extract the maximum flavour and aroma with perfect cream starting from any blend of roasted coffee.

To do so, it calibrates in each service in order to adjust (depending on the service and the coffee dose) the pressure applied to the coffee compactor, the prior infusion and dispensing flows, and the temperature. It must be indicated that said calibration is not performed in each service, but rather when the dose is changed.

In this manner the dispensing can be adapted, for example, between 7 and 14 grammes, enabling the intensity of the coffee to be adapted to the personal tastes of the consumer. The control of each combination of grammes of coffee and selection has been studied including drinks with small volumes of coffee, for which the machine can preheat the chamber in order to obtain perfect quality.

BRIEF DESCRIPTION OF THE DRAWINGS

To better understand what has been set forth, a drawing is attached in which a practical embodiment is schematically depicted merely by way of non-limiting example.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

The FIGURE is a schematic elevation view of the machine for brewing coffee according to the present invention.

DETAILED DESCRIPTION

A description of example embodiments follows.

The FIGURE schematically shows components of the machine for brewing coffee according to an embodiment of the present invention, although it should be indicated that some conventional components have not been represented in the interest of clarity.

The coffee machine comprises a grinder wherein the coffee is ground in each service in order to maximise the taste and flavour obtained.

This grinder, for example, with flat grinding wheels, achieves a constant grinding, since it maintains the flow of processed coffee and varies the time in order to change the dose, for example, between 7 and 14 grammes.

The ground coffee is carried to a dispensing chamber, in which it is compacted by means of a piston 1. Emulating the movements of a barista, the ground coffee is always pressed with the same intensity regardless of performing services with different doses of coffee.

This pressure is produced in the dispensing chamber, wherein the movement of the piston is adjusted depending on the selection of the drink and amount of coffee, achieving an optimal use of the coffee, as described below.

The movement of the piston 1 is controlled by the software which adapts the mechanical movement to the conditions of each type of coffee. The result obtained is a perfect cup of coffee.

In the method according to the present invention, in the step for pressing, the coffee is pressed and then the pressure is reduced depending on the dose used. This reduction of the pressure is performed by varying the position of the piston, if necessary (for example, between the position 0 and the position 25 indicated in the FIGURE).

Furthermore, the position of the piston 1 varies in a manner proportional to the amount of ground coffee present in the dispensing chamber. This variation is a movement towards the compacted ground coffee.

For example, if the amount of ground coffee is 7 grammes, it is determined that the position of the piston 1 does not vary, while if the amount of ground coffee is 14 grammes, the position of the piston 1 varies in the maximum distance thereof, for example, 1 mm. In the case of it being an intermediate amount of ground coffee, the position of the piston 1 will vary in the determined distance thereof.

Due to the gap created by reducing the pressure, a prior infusion or controlled and homogeneous pre-dispensing is performed, by introducing the flow of water for the prior infusion depending on the grammes of coffee that are being used.

The prior infusion includes moistening the ground coffee particles, achieving a slight swelling, enabling the aromatic compounds to be developed freely.

This step translates into a greater quality of coffee in the cup and a better yield of the dose used. The amount of water used in this process is controlled by the software in order to obtain a constant hydraulic retention and a contact of the dispensing flow with all the ground coffee.

Thus, a precise control is achieved for the extraction pressure and time, which is seen in the flavour, aroma and cream obtained in the cup.

Then, the dispensing is performed, and the flow of water used in the dispensing of the coffee is programmed for each service enabling the final user to detain the service at any moment by pushing the service button again.

After the dispensing, the piston 1 presses the mass of ground coffee in order to expel the excess water, for example, by means of a spring, leading this water to a tray for liquids. The mass is mechanically expelled outside the dispensing chamber.

It must also be indicated that a reference position of piston 1 can be determined (called position 0) before the loading of the ground coffee, which is used as a reference for the previously described movement of the piston 1.

The FIGURE also shows that the machine for brewing coffee according to the present invention comprises a motor 2 which actuates the movement of said piston 1 a predetermined distance after the dispensing if it is determined that the amount of ground coffee present in the dispensing chamber is greater than a predetermined minimum amount.

Said motor 2 is preferably a DC motor connected to a voltage regulator 3 which controls the power of the motor during the step for pressing described previously.

In order to control the actuation of the motor, the machine for brewing coffee according to the present invention also comprises a pulse counter 4 which counts the rotation pulses of the output shaft of the motor 2.

Said machine also comprises a position detector 5 of said piston 1 before the introduction of the ground coffee in the dispensing chamber, meaning, in the step for determining the reference position described previously.

A resistor 6 is also provided which measures the compaction force applied by the piston 1 on the ground coffee present in the dispensing chamber.

The components associated with the operation of the machine are connected to electronic control means, which control the operation of the machine through an appropriate software.

Despite having referred to a specific embodiment of the invention, it is evident for one skilled in the art that the method and the machine that have been described are susceptible to a number of variations and modifications, and that all the mentioned details can be replaced with other technically equivalent ones without departing from the scope of protection defined by the attached the claims.

While example embodiments have been particularly shown and described, it will be understood by those skilled in the art that various changes in form and details may be made therein without departing from the scope of the embodiments encompassed by the appended claims.

The teachings of all patents, published applications and references cited herein are incorporated by reference in their entirety.

What is claimed is:

1. A method for brewing coffee, said method comprising:
    loading ground coffee into a dispensing chamber;
    pressing said ground coffee present in the dispensing chamber by means of a piston for compaction thereof;
    dispensing the ground coffee from said dispensing chamber;
    performing a prior infusion of the ground coffee before the dispensing;

determining if a position of the piston varies depending on an amount of the ground coffee that is loaded in said dispensing chamber, wherein a variation in the position of the piston is caused by a movement of the piston with respect to compacted ground coffee present inside the dispensing chamber;

pressing the ground coffee after the dispensing of the ground coffee from said dispensing chamber in order to expel excess water; and releasing internal pressure in the dispensing chamber after the dispensing and before moving the piston to press the ground coffee.

2. The method for brewing coffee according to claim 1, wherein determining a variation of the position of the piston is performed before dispensing the ground coffee.

3. The method for brewing coffee according to claim 2, wherein determining a variation of the position of the piston is performed after pressing the ground coffee.

4. The method for brewing coffee according to claim 1, wherein determining a variation of the position of the piston is performed after pressing the ground coffee.

5. The method for brewing coffee according to claim 1, wherein a variation in the position of the piston is proportional to an amount of ground coffee present in the dispensing chamber.

6. The method for brewing coffee according to claim 1, further comprising determining a reference position of said piston.

7. The method for brewing coffee according to claim 1, wherein a variation in the position of the piston is experienced if the amount of ground coffee present in the dispensing chamber is greater than a predetermined minimum value.

8. The method for brewing coffee according to claim 1, further comprising performing the prior infusion of the ground coffee before the dispensing by introducing a flow of water based on the amount of ground coffee loaded into the dispensing chamber.

* * * * *

UNITED STATES PATENT AND TRADEMARK OFFICE
CERTIFICATE OF CORRECTION

| | |
|---|---|
| PATENT NO. | : 11,730,309 B2 |
| APPLICATION NO. | : 16/836140 |
| DATED | : August 22, 2023 |
| INVENTOR(S) | : José Maria Lopez Ruiz et al. |

It is certified that error appears in the above-identified patent and that said Letters Patent is hereby corrected as shown below:

On the Title Page

Item (72) Inventors, delete "José María López Ruiz" and insert -- José Maria Lopez Ruiz --.

Item (72) Inventors, delete "Luis María Lumbier Moleres" and insert -- Luis Maria Lumbier Moleres --.

Signed and Sealed this
Twenty-first Day of May, 2024

Katherine Kelly Vidal
*Director of the United States Patent and Trademark Office*